(12) United States Patent
Jenne et al.

(10) Patent No.: US 10,635,146 B2
(45) Date of Patent: Apr. 28, 2020

(54) POWER MONITORING CALIBRATION TO A TARGET PERFORMANCE LEVEL

(71) Applicant: Dell Products, L.P., Round Rock, TX (US)

(72) Inventors: John Erven Jenne, Austin, TX (US); Mukund P. Khatri, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 0 days.

(21) Appl. No.: 15/008,558

(22) Filed: Jan. 28, 2016

(65) Prior Publication Data

US 2017/0220362 A1 Aug. 3, 2017

(51) Int. Cl.
G06F 1/26 (2006.01)
G06F 11/34 (2006.01)
G06F 11/30 (2006.01)

(52) U.S. Cl.
CPC ............ *G06F 1/26* (2013.01); *G06F 11/3024* (2013.01); *G06F 11/3409* (2013.01)

(58) Field of Classification Search
CPC .................................................. G06F 9/44505
See application file for complete search history.

(56) References Cited

U.S. PATENT DOCUMENTS

| 7,581,120 | B1* | 8/2009 | Hartman | G06F 1/3203 713/300 |
| 2008/0086656 | A1* | 4/2008 | Chuang | G06F 1/08 713/600 |
| 2009/0055665 | A1* | 2/2009 | Maglione | G06F 1/206 713/320 |
| 2010/0169609 | A1* | 7/2010 | Finkelstein | G06F 1/3203 712/43 |
| 2011/0221405 | A1* | 9/2011 | Tang | H02M 3/156 323/234 |
| 2013/0339777 | A1* | 12/2013 | Varma | G06F 1/26 713/340 |
| 2016/0098334 | A1* | 4/2016 | Hariharakrishnan | G06F 11/3013 702/186 |

OTHER PUBLICATIONS

Intel Corporation. Intel Intelligent Power Node Manager 2.0 External Interface Specification Using IPMI; Order No. 322999; http://www.intel.com/design/literature.htm; Aug. 2013.*

(Continued)

*Primary Examiner* — Kim Huynh
*Assistant Examiner* — Joshua Neveln
(74) *Attorney, Agent, or Firm* — Fogarty LLP

(57) ABSTRACT

Systems and methods for performing power monitoring calibration to a target performance level are described. In some embodiments, an Information Handling System (IHS) may include a plurality of Central Processing Units (CPUs) and a logic circuit coupled to the plurality of CPUs, the logic circuit configured to: measure an operating performance level for each of the plurality of CPUs under a controlled workload and, in response to a determination that the operating performance level of any given one of the CPUs does not match a target performance level for all of the CPUs, apply an offset to a voltage regulator measurement associated with the given CPU that causes the operating performance level of the given CPU to match the target performance level for all of the CPUs.

16 Claims, 5 Drawing Sheets

(56) References Cited

OTHER PUBLICATIONS

Domingo, Don et al. "Fedora 17 Power Management Guide: Managing power consumption on Fedora". Edition 1.0; Red Hat Inc. and others; 2012. Retrieved from https://docs.fedoraproject.org/en-US/Fedora/17/pdf/Power_Management_Guide/Fedora-17-Power_Management_Guide-en-US.pdf on Jul. 13, 2017.*

* cited by examiner

POWER MONITORING CALIBRATION TO A TARGET PERFORMANCE LEVEL

FIELD

This disclosure relates generally to Information Handling Systems (IHSs), and more specifically, to systems and methods for performing power monitoring calibration to a target performance level.

BACKGROUND

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

SUMMARY

Embodiments of systems and methods for performing power monitoring calibration to a target performance level are described herein. In an illustrative, non-limiting embodiment, an Information Handling System (IHS) may include a plurality of Central Processing Units (CPUs) and a logic circuit coupled to the plurality of CPUs, the logic circuit configured to: measure an operating performance level for each of the plurality of CPUs under a controlled workload and, in response to a determination that the operating performance level of any given one of the CPUs does not match a target performance level for all of the CPUs, apply an offset to a voltage regulator measurement associated with the given CPU that causes the operating performance level of the given CPU to match the target performance level for all of the CPUs.

The logic circuit may be a Basic Input/Output System (BIOS). The BIOS may be configured to measure the operating performance in response to an SMI (System Management Interrupt) issued by a Baseboard Management Controller (BMC). The operating performance level of the given CPU may be below the target performance level for all of the CPUs, and the offset may have a negative value. In that case, the offset compensates for the IHS's otherwise over reporting of the operating performance level of the given CPU. Alternatively, the operating performance level of the given CPU may be above the target performance level for all of the plurality of CPUs, and the offset may have a positive value. In this case, the offset compensates for the IHS's otherwise under reporting of the operating performance level of the given CPU.

In some implementations, to apply the offset, the BIOS may be configured to write the offset to an output current ($I_{OUT}$) measurement of a Power Management Bus (PM-BUS)-enabled voltage regulator using a Host Embedded Controller Interface (HECI)-to-PMBUS proxy. Additionally or alternatively, the logic circuit may be a Baseboard Management Controller (BMC), and to apply the offset the BMC may be configured to write the offset to an output current ($I_{OUT}$) measurement of a PMBUS-enabled voltage regulator using an IPMB-to-PMBUS proxy.

The logic circuit may be further configured to remove the offset from the voltage regulator measurement associated with the given CPU in response to a user's request to report the operating performance level of the given CPU. The offset may be selected to maintain a power consumed by the given CPU within a reporting error band indicated by a manufacturer to the CPU for the operating performance level. The target performance level for all of the CPUs may be an average of the operating performance levels of all of the CPUs. Alternatively, the target performance level for all of the CPUs may be a highest of the operating performance levels of all of the CPUs. In some cases, the target performance level for all of the CPUs further includes other CPUs of a plurality of other IHSs in a server cluster.

In another illustrative, non-limiting embodiment, a memory device may have program instructions stored thereon that, upon execution, cause an IHS having a plurality of CPUs to: measure an operating performance level for each of the plurality of CPUs; and in response to a determination that the operating performance level of any given one of the CPUs does not match a target performance level for all of the CPUs, apply an offset to a voltage regulator measurement associated with the given CPU that causes the operating performance level of the given CPU to match the target performance level for all of the CPUs, wherein the offset is selected to maintain a power consumed by the given CPU within a reporting error band indicated by a manufacturer to the CPU for the operating performance level.

The operating performance level of the given CPU may be below the target performance level for all of the CPUs, and the offset may have a negative value that compensates for the IHS's otherwise over reporting of the operating performance level of the given CPU. Or the operating performance level of the given CPU may be above the target performance level for all of the plurality of CPUs, and the offset may have a positive value that compensates for the IHS's otherwise under reporting of the operating performance level of the given CPU.

In yet another illustrative, non-limiting embodiment, in an IHS having a plurality of CPUs, a method may include measuring an operating performance level for each of the plurality of CPUs and, in response to a determination that the operating performance level of any given one of the CPUs does not match a target performance level for all of the CPUs, applying an offset to a voltage regulator measurement associated with the given CPU that causes the operating performance level of the given CPU to match the target performance level for all of the CPUs, wherein the offset is selected to maintain a power consumed by the given CPU within a reporting error band indicated by a manufacturer to the CPU for the operating performance level.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

Figure 1:
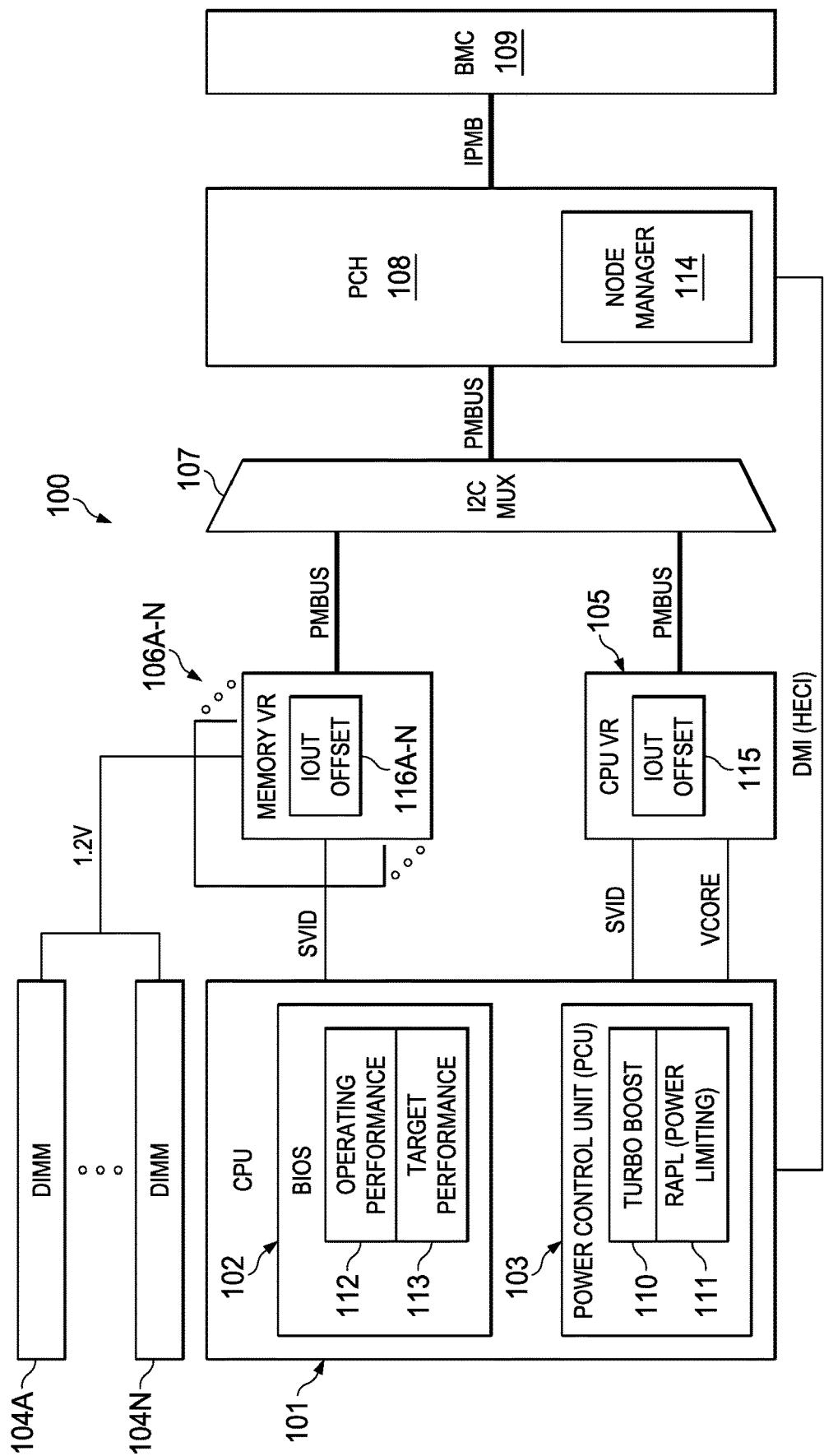
FIG. 1 is a block diagram of an example of an Information Handling System (IHS) architecture configured to implement systems and methods described herein according to some embodiments.

FIG. 1 is a block diagram of an example of an Information Handling System (IHS) architecture 100 configured to implement systems and methods described herein according to some embodiments. For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components. Additional details are shown below in connection with FIG. 7.

As shown in FIG. 1, system 100 includes CPU 101, which in turn includes Basic Input/Output System (BIOS) 102 and Power Control Unit (PCU) 103. System 100 also includes memories 104A-N. CPU 101 is coupled to voltage regulator(s) (CPU VR) 105, and each of memories 104A-N (e.g., dual in-line memory module or DIMMs) may be coupled to its own voltage regulator(s) (memory VR) 106A-N, respectively. System 100 further includes Inter-Integrated Circuit (I²C) multiplexer (I²C mux) 107, Platform Controller Hub (PCH) 108, and Baseboard Management Controller (BMC) 109.

CPU 101 is communicatively coupled to memory VR 106A-N and CPU VR 105 via Serial Voltage Identification (SVID) lines. Memory VR 106A-N provides a supply voltage to CPU 101 ($V_{CORE}$), and another supply voltage to memories 104A-N (e.g., 1.2 V). Both CPU VR 105 and memory VR 106A-N are coupled to I²C mux 107 via a PMBUS, and I²C mux 107 is coupled to PCH 108 via the PMBUS. PCH 108 is coupled to CPU 101 via a Host Embedded Controller Interface (HECI), and BMC 109 is coupled to PCH 108 via Intelligent Platform Management Bus (IPMB).

PCU 103 includes at least the following modules: turbo boost module 110 and Running Average Power Limit (RAPL) module 111. Turbo boost module 110 is configured to allow CPU 101 to opportunistically and automatically run faster than its rated operating frequency/render clock, if it is operating below power, temperature, and current limits. RAPL module 111 is a power and time constant pair which define an average power constraint for a given voltage domain, and which is controlled by PCU 103.

With respect to turbo frequencies, the CPU 101's rated frequency assumes that CPU 101 is running an application at the thermal design power (TDP). However, under typical operation, not all cores within CPU 101 are active. Therefore, most applications are consuming less than the TDP at the rated frequency. To take advantage of the available thermal headroom, CPU 101 can increase is operating frequency, also known as "turbo."

To determine the highest performance frequency CPU 101 takes the following into consideration: (a) the number of cores operating; (b) the estimated core current consumption; (c) the estimated package prior and present power consumption; and (d) the package temperature. Any of these factors can affect the maximum frequency for a given workload. If the power, current, or thermal limit is reached, CPU 101 automatically reduces its operating frequency to stay within its TDP limit.

To implement turbo, CPU 101 may use either calculated or real-time CPU power measurements as inputs to CPU power control loops such as turbo boost 110 and RAPL 111. In various embodiments, system 100 may use real-time measurements.

While the use of real-time CPU power measurements has certain benefits, it introduces power measurement accuracy issues. CPU manufacturers provide power measurement errors ranging between +/−4% to +/−5%. For instance, if a two-CPU IHS is designed to meet any given accuracy target, a first CPU may measure its consumed power 5% too low and a second CPU may measure its power consumption 5% too high, for a 10% delta between the two. While this delta is typically not noticeable in most applications, it becomes more noticeable when looking at larger server clusters.

In some cases, the power measurement accuracy problems may lead to a large (~200 MHz or more) operating frequency delta between the highest performing IHS and lowest performing IHS in a server cluster. The end-user also has expectation of achieving performance levels marketed by the CPU's manufacturer consistently across their data center. The end-user therefore has an expected or "target" performance level such as sustained operating frequency for non-Advanced Vector Extension (AVX) workloads at or above non-AVX base frequency, and sustained operating frequency for AVX workloads at or above AVX base frequency. Due to the aforementioned power measurement accuracy problems, however, it is ordinarily possible that that an end user's system's performance is below performance levels marketed by the manufacturer.

The standard solution to power measurement accuracy is to invest in higher accuracy hardware or to calibrate in the factory, which introduce excessive cost and/or complexity. In contrast, techniques described herein a novel solution for in-system characterization (ISC) to calibrate power measurements to achieve a target performance level. Generally speaking, system 100 may be configured to perform a characterization operation and then to adjust a CPU VR offset until a target CPU frequency is achieved.

To that end, BIOS 102 characterizes system 100 as part of a Power-On Self Test (POST) by running a controlled CPU and memory workload and collecting various power measurements, including the output electrical current $I_{OUT}$ provided by CPU VR 105. In some cases, node manager 114 starts a controlled workload. Initiated by a periodic System Management Interrupt (SMI) from BMC 109, BIOS 102 gathers CPU 101 performance and power measurements and compares the performance to a target performance level, discussed in more detail below.

BIOS 112 then applies an offset to the power measurements by writing "$I_{OUT}$ offsets" 115 and 116A-N to the $I_{OUT}$ measurements (made by each VR) of PMBUS-enabled VRs 105 and/or 106A-N, respectively. In this example, BIOS 102 may use a HECI-to-PMBUS proxy to configure VR's $I_{OUT}$ measurements offset 115 and 116A-N. Alternatively, BMC 109 may gather performance and power measurements, calculate VR $I_{OUT}$ offsets 115 and 116A-N, and write the offsets via a IPMB-to-PMBUS proxy. In the latter implementation, the periodic SMI may trigger BIOS 102 to write CPU performance information in a shared memory space, which may then be read by BMC 109.

As such, BIOS 102 measures operating performance 112 (in terms of frequency of operation) in addition to power, and then compares the operating performance 112 to a target performance level 113. If the operating performance 112 is not equal to the target performance 113, BIOS 112 may adjust $I_{OUT}$ offset 115 (that is, it may modify the reported power measurement) up or down until the target performance level 113 is met.

If the operating performance 112 is below the target performance 113, the power measurements are over-reporting, and thus a positive $I_{OUT}$ offset 115 is applied. Conversely, if the operating performance 112 is above the target performance 113, the power measurements are under-reporting, and thus a negative $I_{OUT}$ offset 115 is applied.

Figure 2:
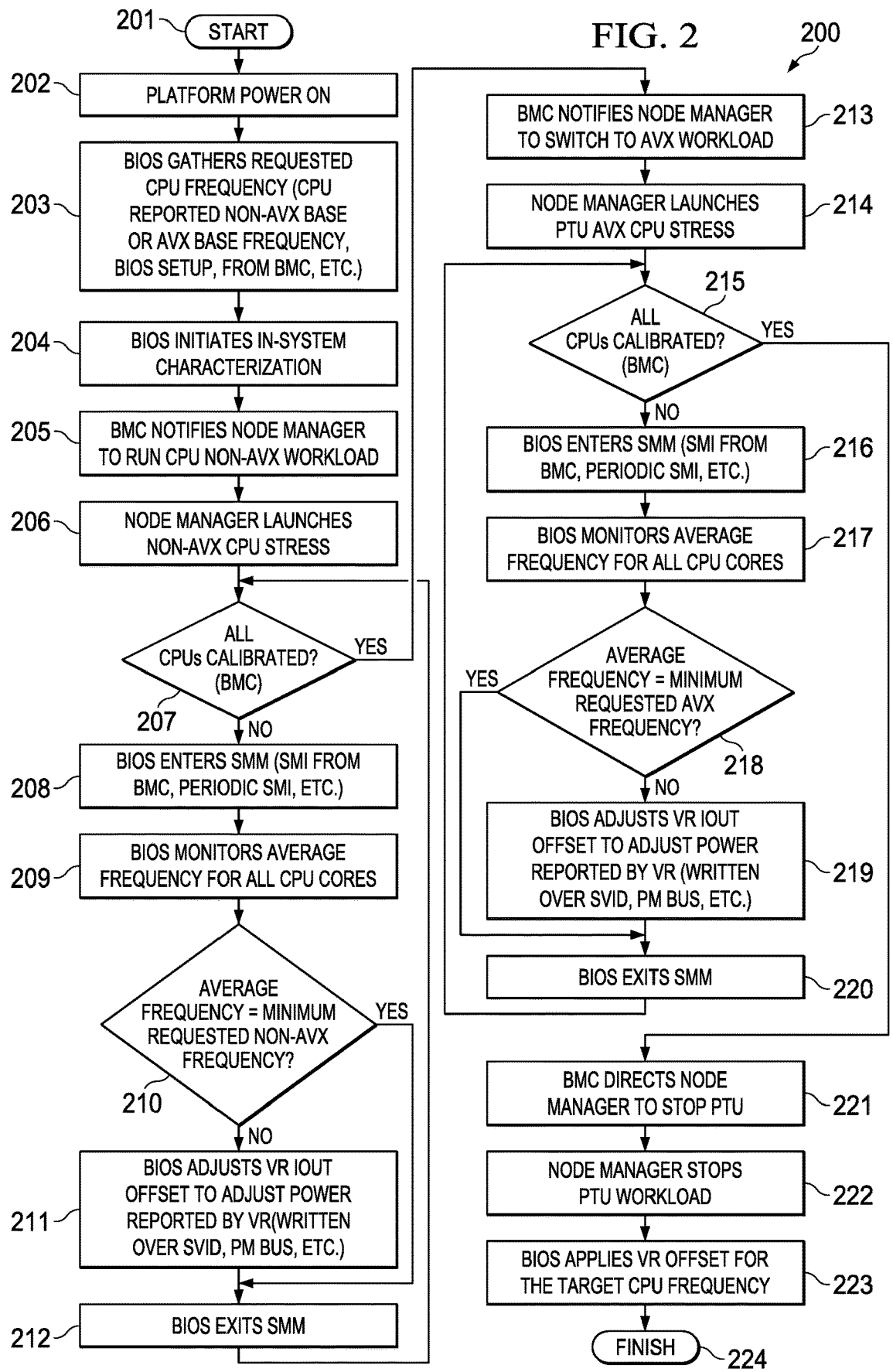
FIG. 2 is a flowchart of an example of a method for performing power monitoring calibration to a target performance level according to some embodiments.
Figure 3:
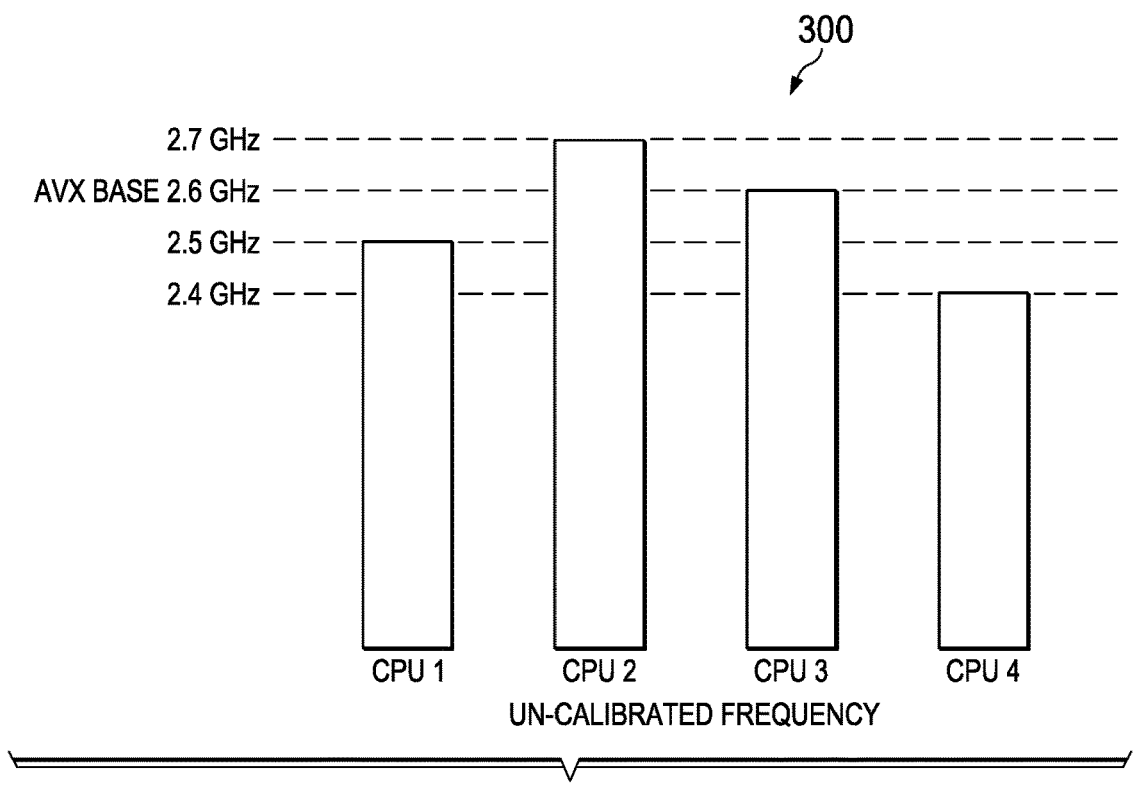
FIGS. 3 and 4 are graphs illustrating operating performance levels for a plurality of Central Processing Units (CPUs) according to some embodiments.
Figure 4:
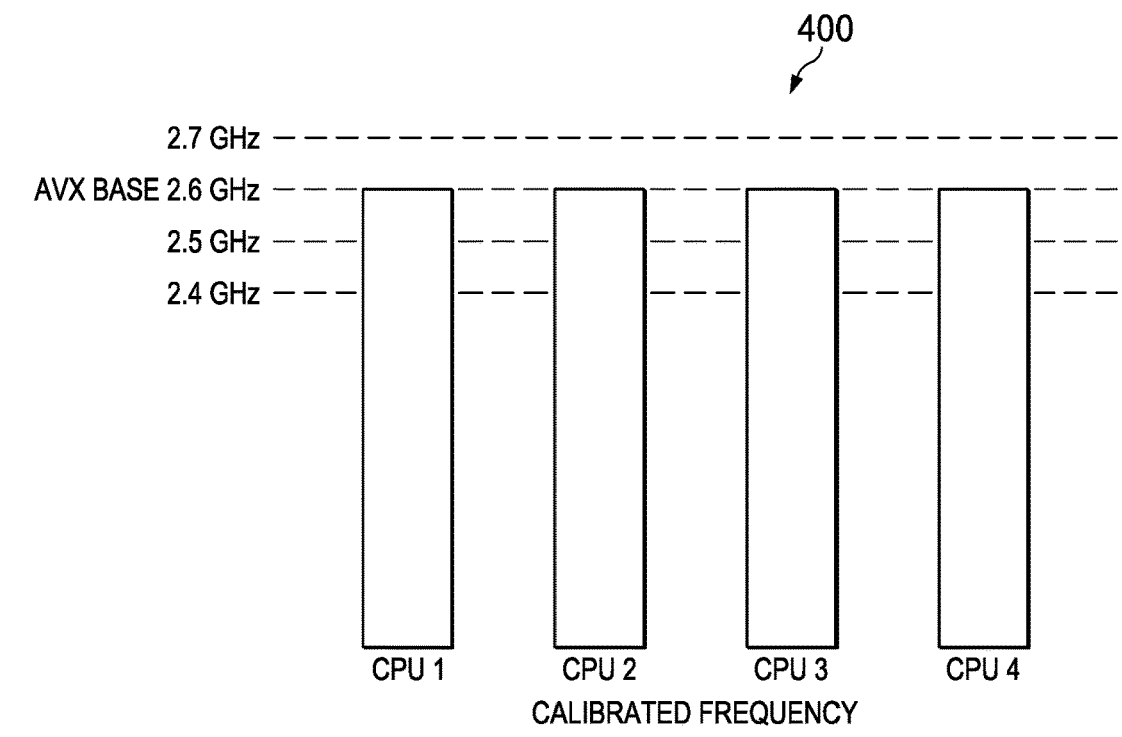
Figure 5:
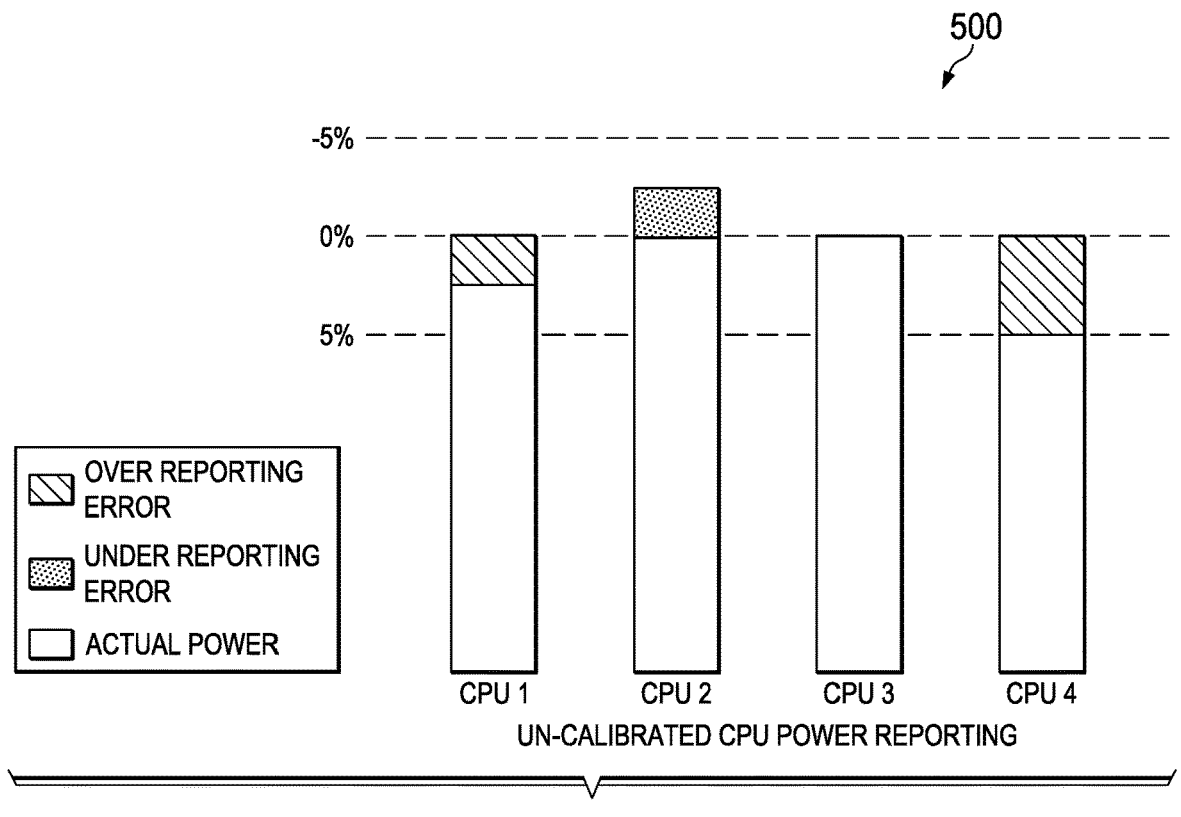
FIGS. 5 and 6 are graphs illustrating power reporting for the plurality of CPUs according to some embodiments.
Figure 6:
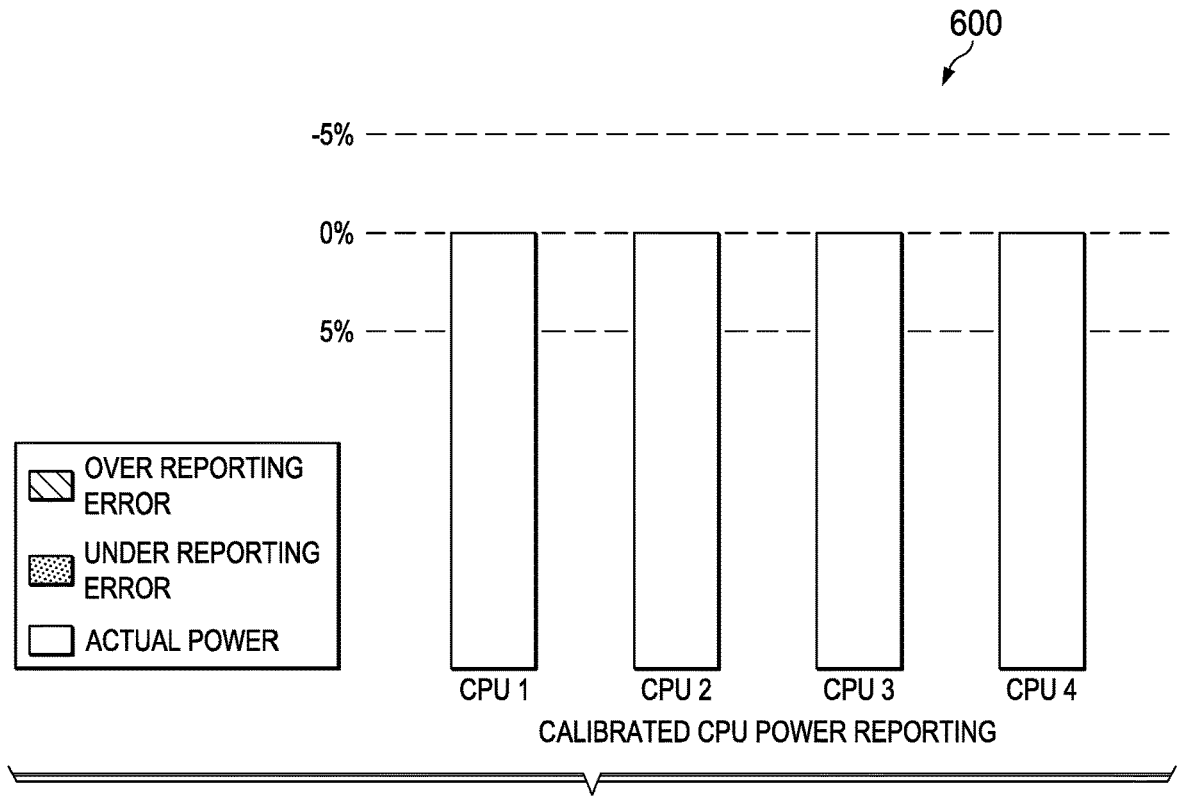

FIG. 2 is a flowchart of an example of a method for performing power monitoring calibration to a target performance level according to some embodiments. At block 201, method 200 begins, and, at block 202, method 200 determines whether CPU 101 is powered on. At block 203, BIOS 112 gathers requested CPU frequency or settings (e.g., CPU reported non-AVX base or AVX base frequency, etc.). At block 204, BIOS 112 begins an in-system characterization (ISC) operation.

The ISC operation may be performed both for AVX and for non-AVX instructions as follows. First, at block 205, BMC 109 notifies node manager 114 to run a CPU non-AVX workload, and at block 206 node manager 114 launches a non-AVX CPU stress upon CPU 101 as part of a Power Thermal Utility (PTU). At block 207, method determines whether all CPUs at issue have been calibrated. If not, at block 208 BIOS 112 enters System Management Mode (SMM) upon receiving an SMI from BMC 109 or periodic SMIs, for example. At block 209, BIOS 112 monitors an average frequency for all cores within CPU 101.

At block 210, if BIOS 112 determines that the average frequency is equal to the minimum requested non-AVX frequency, BIOS exits SMM at block 212 and control returns to block 207. Conversely, if BIOS 112 determines that the average frequency is different from the minimum requested non-AVX frequency, BIOS 112 adjusts VR $I_{OUT}$ offset 115 to artificially manipulate the power consumption level otherwise reported by CPU VR 105. Then again BIOS exits SMM at block 212 and control returns to block 207.

At block 213, once all CPUs have been calibrated (as determined by BMC 109), BMC 109 notifies node manager 114 to switch to an AVX workload. Thus, at block 214, node manager 114 launches an AVX CPU stress upon CPU 101. Blocks 215-220 perform similar operations as blocks 207-212, but this time for an AVX workload. In some cases, different $I_{OUT}$ offsets may be used for the AVX and non-AVX modes.

At block 221, BMC 109 directs node manager 114 to stop the PTU stress tests, and at block 222 node manager 114 stops the tests. At block 223, BIOS 112 applies calculated VR offsets to VR 105 as $I_{OUT}$ offset 115 to cause the operating frequency or performance 112 match the target performance or frequency 113. A similar method may be performed for each of memories 104A-$_N$ to calibrate $I_{OUT}$ offsets 116A-N.

To further illustrate how method 200, when executed by system 100, may intelligently calibrate VR 105 to provide consistent performance (CPU frequency) while keeping CPU power reporting within the standard VR reporting error band, attention is turned to FIGS. 3-6, each of showing aspects of the method's operation for an example IHS with 4 CPUs.

Particularly, graph 300 shows un-calibrated frequency (or "performance") for each CPU prior to the application of method 200. In this example, CPU 3 operates at the AVX base frequency of 2.6 GHz. Here, the "base frequency" is guaranteed by the CPU manufacturer to be supported within the CPU's TDP and is validated within the manufacturer's factory. Although every CPU is identical to each other within the error bands provided by the manufacturer, CPU 1 runs at 2.5 GHz, CPU 2 runs at 2.7 GHz, and CPU 4 runs at 2.4 GHz. Meanwhile, graph 500 shows un-calibrated CPU power reporting provided by CPU VR 105 in the absence of VR offset 115. From this graph it may be noted that CPU 1 has its power consumption over reported (as compared to the actual power consumption) by approximately 2.5%, CPU 2 has its power under reported by approximately 2.5%, CPU 3 reports the actual power consumed, and CPU 4 also over reports by 5%.

Graph 600 shows CPU power reporting calibrated by $I_{OUT}$ offsets for each of CPUs 1, 2, and 4. In this case, CPU 3 does not need calibration, or the $I_{OUT}$ offset for that CPU may be set to zero. That is, CPU 3 is selected as operating at the target performance level or frequency 113, and therefore the target performance level or frequency of CPU 3 is the same as its operating performance level of frequency. The power consumption reported by each of CPUs 1, 2, and 4 is then adjusted so that the resulting operating frequency for that power (dictated by the corresponding $I_{OUT}$ value) matches the operating frequency of CPU 3, selected to be the target performance 113.

Specifically, still referring to graph 600, a positive $I_{OUT}$ offset is applied to CPU 1's power reporting, a larger (still positive) $I_{OUT}$ offset is applied to CPU 4's power reporting, and a negative $I_{OUT}$ offset for CPU 2 cause all CPUs to report their power consumed as being the same, adjusted to match the power consumption reported by CPU 3. In some cases, these offsets may be adjusted dynamically over time to control the operating frequency of the CPU.

It should be noted that the original power reported by any CPU is the actual power consumed by that CPU, but with the measurement error included. The $I_{OUT}$ offsets manipulate the reporting by each VR, but not the actual measurements made by BIOS 112 or BMC 109.

For example, with respect to CPU 1, the power consumed is reported to be higher than the actual consumption; that is, the power consumption reported by CPU 1 is equal to the actual consumption plus an error, which is used as the $I_{OUT}$ offset for CPU 1. This offset, once applied to the measured consumed power for CPU 1 and reported out as if it were true, causes CPU 1 to increase its operating performance or frequency. As to CPU 2, the power consumed is reported to be lower than the actual consumed power; that is, the power consumption reported by CPU 2 is equal to the actual consumption minus an amount corresponding to a different $I_{OUT}$ offset. This different offset, when applied to the measured consumed power for CPU 2 and reported out as if it were true, causes CPU 2 to reduce is operating performance or frequency. Thus, as a result of the application of the $I_{OUT}$ offsets to each respective VR, the calibrated frequencies for all CPUs shown in graph 400 is equalized.

Although in the foregoing examples all CPUs had their VR's $I_{OUT}$ offsets adjusted to match the power consumption of CPU 3, in other embodiments other approaches may be used. For instance, in some cases the target performance level for all of the CPUs may be an average of the operating performance levels of all of the CPUs. Additionally or alternatively, the target performance level for all of the CPUs may be a highest of the operating performance levels of all of the CPUs.

While the foregoing techniques may guarantee a minimum performance level, they may also introduce additional power reporting error. In some embodiments, to compensate for these errors, power measurements reported via system software (e.g., via BMC 109) may remove each offset before reporting to end user.

In various embodiments, the server-node level solution described herein may be readily extended to a multi-node solution, for example, in a sever cluster with multiple IHSs, each IHS having a plurality of CPUs. In certain applications, harmonization of operating performance across various CPUs and across various IHSs is more important that achieving high performance with fewer than all CPUs.

For example, in some implementations, CPUs may be configured to execute a high-frequency trading (HFT) application or the like. High-frequency trading (HFT) is the automated, rapid trading of securities. HFT uses specialized trading algorithms to move in and out of positions in seconds (or fractions of a second), moving in and out of short-term positions and aiming to capture small profits on every trade. IHSs designed for HFT can sometimes handle round-trip order execution speeds (from hitting "transmit order" to receiving an acknowledgment) of a few microseconds therefore requiring very low latencies or high operating frequencies, with reduced execution jitter. And in these types of applications, it is particularly important that the operating frequency be the same across all CPUs.

In the case of a multiple IHS, modular systems may broadcast the same target performance to all IHSs in the system. The concept may also be extended to the cluster or datacenter level where system management software broadcast the same target performance to all server nodes in the cluster or datacenter.

For example, when expanding beyond a single node, a higher level algorithm may automatically determine an optimal performance level and set that level as the target performance. Each IHS in a cluster may run in-system characterization procedures to determine its un-calibrated operating performance. The results for each of the nodes may then be analyzed to determine an optimal performance target for the group of nodes.

In some embodiments, the system and methods described herein may also be used to help support "over-clocking" for higher performance. Due to power limits such as the CPU's TDP, the CPU operating frequency is clipped to limit power. By adjusting the CPU's power monitoring with a negative offset, however, the CPU is allowed to run at higher power level and therefore a higher performance level. For example, in some cases the user may select the CPU target performance level from a list of frequencies supported by the platform.

Figure 7:
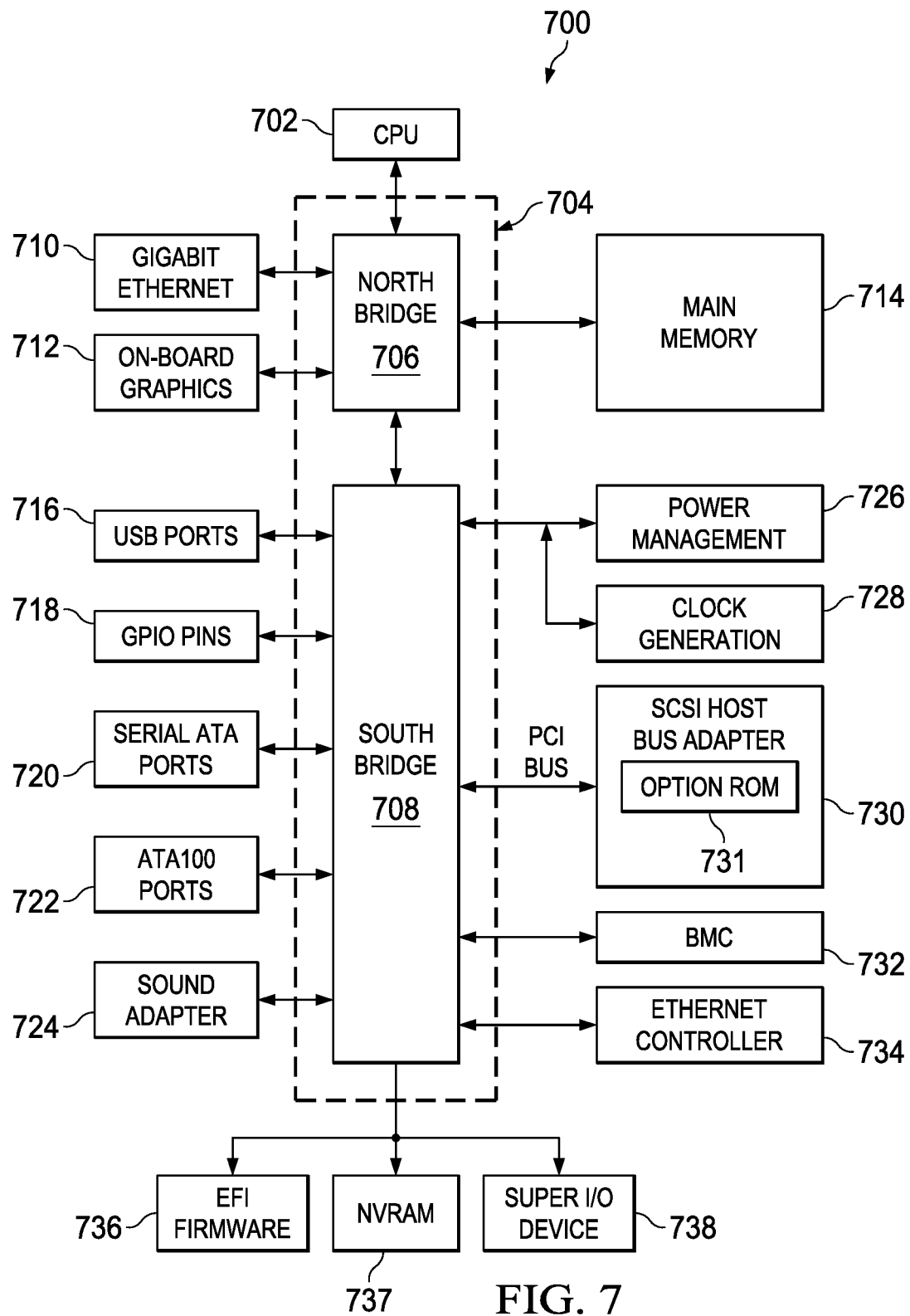
FIG. 7 is a block diagram of an example of an Information Handling System (IHS) configured to implement systems and methods described herein according to some embodiments.

FIG. 7 shows an example of IHS 700 configured to implement any IHS described herein according to some embodiments. It should be appreciated that although certain embodiments described herein may be discussed in the context of a desktop or server computer, other embodiments may be utilized with virtually any type of IHS. Particularly, IHS 700 includes a baseboard or motherboard, which is a printed circuit board (PCB) to which components or devices are coupled by way of a bus or other electrical communication path. For example, central processing unit ("CPU") 702 operates in conjunction with a chipset 704; CPU 702 is a standard central processor that performs arithmetic and logical operations necessary for the operation of IHS 700. In various embodiments, a single IHS 700 may have a plurality of CPUs.

Chipset 704 includes northbridge 706 and southbridge 708. Northbridge 706 provides an interface between CPU 702 and the remainder of IHS 700. Northbridge 706 also provides an interface to a random access memory (RAM) used as main memory 714 in IHS 700 and, possibly, to on-board graphics adapter 712. Northbridge 706 may also be configured to provide networking operations through Ethernet adapter 710. Ethernet adapter 710 is capable of connecting IHS 700 to another IHS (e.g., a remotely located IHS) via a network. Connections which may be made by network adapter 710 may include local area network (LAN) or wide area network (WAN) connections. Northbridge 706 is also coupled to southbridge 708.

Southbridge 708 is responsible for controlling many of the input/output (I/O) operations of IHS 700. In particular, southbridge 708 may provide one or more universal serial bus (USB) ports 716, sound adapter 724, Ethernet controller 734, and one or more general purpose input/output (GPIO) pins 718. Southbridge 708 may also provide a bus for interfacing peripheral card devices such as BIOS boot system-compliant SCSI host bus adapter 730. In some embodiments, the bus may include a peripheral component interconnect (PCI) bus. Southbridge 708 may also provide baseboard management controller (BMC) 732 for use in managing the various components of IHS 700. Power management circuitry 726 and clock generation circuitry 728 may also be utilized during the operation of southbridge 708.

Southbridge 708 is further configured to provide one or more interfaces for connecting mass storage devices to IHS 700. For instance, in an embodiment, southbridge 708 may include a serial advanced technology attachment (SATA) adapter for providing one or more serial ATA ports 720 and/or an ATA 100 adapter for providing one or more ATA 100 ports 722. Serial ATA ports 720 and ATA 100 ports 722 may be, in turn, connected to one or more mass storage devices storing an operating system (OS) and application programs. An OS comprises a set of programs that control operations of IHS 700 and allocation of resources. An application program is software that runs on top of the OS and uses computer resources made available through the OS to perform application specific tasks desired by the user.

Mass storage devices connected to southbridge 708 and SCSI host bus adapter 730, and their associated computer-readable media provide non-volatile storage for IHS 700.

Although the description of computer-readable media contained herein refers to a mass storage device, such as a hard disk or CD-ROM drive, it should be appreciated a person of ordinary skill in the art that computer-readable media can be any available media on any memory storage device that can be accessed by the IHS 700. Examples of memory storage devices include, but are not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices.

A low pin count ("LPC") interface may also be provided by southbridge 708 for connecting Super I/O device 738. Super I/O device 738 is responsible for providing a number of I/O ports, including a keyboard port, a mouse port, a serial interface, a parallel port, and other types of input/output ports. The LPC interface may also connect a computer storage media such as a ROM or a flash memory such as a non-volatile random access memory (NVRAM) for storing firmware 736 that includes program code containing the basic routines that help to start up IHS 700 and to transfer information between elements within IHS 700. EFI firmware 736 comprises a firmware that is compatible with the EFI Specification and the Framework.

The LPC interface may also be utilized to connect NVRAM 737 to IHS 700. NVRAM 737 may be utilized by firmware 736 to store configuration data for IHS 700. In other embodiments, configuration data for IHS 700 may be stored on the same NVRAM 737 as the firmware 736.

BMC 732 may include non-volatile memory having program instructions stored thereon that are usable by CPU(s) 702 to enable remote management of IHS 700. For example, BMC 732 may enable a user to discover, configure, and manage BMC 732, setup configuration options, resolve and administer hardware or software problems, etc. Additionally or alternatively, BMC 732 may include one or more firmware volumes, each volume having one or more firmware files used by the BIOS' firmware interface to initialize and test components of IHS 700.

As a non-limiting example of BMC 732, the integrated DELL Remote Access Controller (iDRAC) from DELL, INC. is embedded within DELL POWEREDGE servers and provides functionality that helps information technology (IT) administrators deploy, update, monitor, and maintain servers with no need for any additional software to be installed. The iDRAC works regardless of OS or hypervisor presence from a pre-OS or bare-metal state, because iDRAC is embedded within IHS 700 from the factory.

It should be appreciated that, in other embodiments, IHS 700 may comprise other types of computing devices, including hand-held computers, embedded computer systems, personal digital assistants, and other types of computing devices. It is also contemplated that the IHS 700 may not include all of the components shown in FIG. 7, may include other components that are not explicitly shown in FIG. 7, or may utilize an architecture different than that shown in FIG. 7.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS), comprising:
a plurality of Central Processing Units (CPUs); and
a logic circuit coupled to the plurality of CPUs, the logic circuit configured to:
measure an operating frequency for each of the plurality of CPUs;
in response to a determination that the operating frequency of any given one of the CPUs does not match a target frequency for all of the CPUs, apply a value to a measurement of an output current of a voltage regulator associated with the given CPU, wherein the value is selected based upon a determination of whether the given CPU is operating in Advanced Vector Extensions (AVX) mode or in non-AVX mode; and
report the measurement offset by the value without correcting the voltage regulator with respect to the offset, wherein the reporting causes a turbo circuit to match the operating frequency of the given CPU to the target frequency, and wherein the value is selected to maintain a power consumed by the given CPU within a reporting error band indicated by a manufacturer of the CPU for the operating frequency.

2. The IHS of claim 1, wherein the logic circuit is a Basic Input/Output System (BIOS).

3. The IHS of claim 2, wherein the BIOS is configured to measure the operating performance in response to System Management Interrupt (SMI) issued by a Baseboard Management Controller (BMC).

4. The IHS of claim 2, wherein to report the measurement, the BIOS is configured to subtract the offset from or add the offset to the measurement of a Power Management Bus (PMBUS)-enabled voltage regulator using a Host Embedded Controller Interface (HECI)-to-PMBUS proxy.

5. The IHS of claim 1, wherein the offset compensates for the IHS's under reporting of the operating frequency of the given CPU.

6. The IHS of claim 1, wherein the logic circuit is a Baseboard Management Controller (BMC), and wherein to report the measurement, the BMC is configured to subtract the offset from or add the offset to the measurement of a Power Management Bus (PMBUS)-enabled voltage regulator using an Intelligent Platform Management Bus (IPMB)-to-PMBUS proxy.

7. The IHS of claim 1, wherein the logic circuit is further configured to provide the measurement associated with the given CPU without the offset in response to a user's request to report the operating frequency of the given CPU.

8. The IHS of claim 1, wherein the offset is selected based upon a reporting error band indicated by a manufacturer to the CPU for the operating frequency.

9. The IHS of claim 1, wherein the target frequency is an average of the operating frequencies of all of the CPUs.

10. The IHS of claim 1, wherein the target frequency is a highest of the operating frequencies of all of the CPUs.

11. The IHS of claim 1, wherein the target frequency further includes other CPUs of a plurality of other IHSs in a server cluster.

12. A memory device having program instructions stored thereon that, upon execution, cause an Information Handling System (IHS) having a plurality of Central Processing Units (CPUs) to:
measure an operating frequency for each of the plurality of CPUs;
in response to a determination that the operating frequency of any given one of the CPUs does not match a target frequency for all of the CPUs, apply a value to a measurement of an output current of a voltage regulator associated with the given CPU, wherein the value is selected based upon a determination of whether the given CPU is operating in Advanced Vector Extensions (AVX) mode or in non-AVX mode; and
report the measurement offset by the value without correcting the voltage regulator with respect to the offset, wherein the reporting causes a turbo circuit to match the operating frequency of the given CPU to the target frequency, and wherein the value is selected to maintain a power consumed by the given CPU within a reporting error band indicated by a manufacturer of the CPU for the operating frequency.

13. The memory device of claim 12, wherein the operating frequency of the given CPU is above the target frequency for all of the plurality of CPUs, and wherein the value is a positive value that compensates for the IHS's over reporting of the operating frequency of the given CPU.

14. In an Information Handling System (IHS) having a plurality of Central Processing Units (CPUs), a method comprising:
measuring an operating frequency for each of the plurality of CPUs;
in response to a determination that the operating frequency of any given one of the CPUs does not match a target frequency for all of the CPUs, applying a value to a measurement of an output current of a voltage regulator associated with the given CPU, wherein the value is selected as a first value in response to a determination that the given CPU is operating in Advanced Vector Extensions (AVX) mode or as a second value different from the first value in response to a determination that the given CPU is operating in non-AVX mode; and
reporting the measurement offset by the value while abstaining from correcting the voltage regulator with respect to the offset, wherein the reporting causes a turbo circuit to match the operating frequency of the given CPU to the target frequency, and wherein the value is selected to maintain a power consumed by the given CPU within a reporting error band indicated by a manufacturer of the CPU for the operating frequency.

15. The method of claim 14, wherein the operating frequency of the given CPU is below the target frequency, and wherein the value is a negative value that compensates for the IHS's under reporting of the operating frequency of the given CPU.

16. The method of claim 14, wherein the operating frequency of the given CPU is above the target frequency, and wherein the value is a positive value that compensates for the IHS's over reporting of the operating frequency of the given CPU.

* * * * *